United States Patent
Bernabeu-Auban et al.

(10) Patent No.: US 7,581,232 B2
(45) Date of Patent: Aug. 25, 2009

(54) COORDINATING REFERENCE COUNTING BETWEEN ENTITIES EXECUTING WITHIN SEPARATE ADDRESS SPACES

(75) Inventors: Jose M. Bernabeu-Auban, Sammamish, WA (US); Jeff L. Havens, Issaquah, WA (US); Yousef A. Khalidi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 679 days.

(21) Appl. No.: 11/130,308

(22) Filed: May 16, 2005

(65) Prior Publication Data

US 2006/0259489 A1 Nov. 16, 2006

(51) Int. Cl.
G06F 3/00 (2006.01)
G06F 9/44 (2006.01)
G06F 9/46 (2006.01)
G06F 13/00 (2006.01)
G06F 15/173 (2006.01)

(52) U.S. Cl. .............. 719/330; 719/315; 719/316; 718/104; 709/226

(58) Field of Classification Search .............. 709/203, 709/223–229; 719/315, 316, 318, 328, 330; 718/104; 712/28; 707/206
See application file for complete search history.

(56) References Cited

U.S. PATENT DOCUMENTS

| | | | | |
|---|---|---|---|---|
| 5,907,675 A | * | 5/1999 | Aahlad | 709/203 |
| 6,119,115 A | * | 9/2000 | Barr | 707/8 |
| 6,138,251 A | * | 10/2000 | Murphy et al. | 714/41 |
| 6,338,063 B1 | * | 1/2002 | Barr | 707/8 |
| 6,381,628 B1 | * | 4/2002 | Hunt | 709/201 |
| 6,381,653 B1 | * | 4/2002 | Feray et al. | 719/315 |
| 7,043,733 B2 | * | 5/2006 | Limprecht et al. | 719/315 |
| 7,043,734 B2 | * | 5/2006 | Limprecht et al. | 719/315 |
| 7,062,770 B2 | * | 6/2006 | Limprecht et al. | 719/315 |
| 7,076,784 B1 | * | 7/2006 | Russell et al. | 719/315 |

(Continued)

FOREIGN PATENT DOCUMENTS

EP 0889397 A2 * 7/1999

(Continued)

OTHER PUBLICATIONS

Bevan, David, "An efficient reference counting solution to the distributed garbage collection problem", 1989, Parallel Computing, vol. 9, pp. 179-192.*

(Continued)

*Primary Examiner*—Li B Zhen
*Assistant Examiner*—Qing-Yuan Wu
(74) *Attorney, Agent, or Firm*—Woodcock Washburn LLP

(57) ABSTRACT

Reference counting is shared between an in-process service runtime and a machine-wide service. The service maintains a global reference count, a global export count, and an exports before revoke count. When the global reference count for a resource or object drops to zero, the machine-wide service deletes the table entry for the object or resource and sends an unref message including the value of the global export count to the sharing process. If the local export count is greater than the global export count of the unref, there are committed exports which have not yet been unreferenced. If both counts are the same, the committed exports have been accounted for and a revoke operation can be issued.

14 Claims, 4 Drawing Sheets

U.S. PATENT DOCUMENTS

2003/0023768 A1\* 1/2003 Foti .......................... 709/315
2003/0225870 A1\* 12/2003 Sandadi et al. ............. 709/223
2005/0188380 A1\* 8/2005 Li et al. ..................... 719/316
2005/0193392 A1\* 9/2005 Carusi et al. ................ 719/315

FOREIGN PATENT DOCUMENTS

EP 0889397 A2 \* 2/2002

OTHER PUBLICATIONS

Mitchell, J.G. et al., "An Overview of the Spring System", *Compcon: Digest of Technical Papers*, 1994, 39, 122-131.

\* cited by examiner

COORDINATING REFERENCE COUNTING BETWEEN ENTITIES EXECUTING WITHIN SEPARATE ADDRESS SPACES

CROSS-REFERENCE TO RELATED CASES

This application is related in subject matter to U.S. patent application Ser. No. 11/130,301, entitled "Self-Registering Objects For An Inter-Process Communication Mechanism" filed herewith, U.S. patent application Ser. No. 11/129,848 entitled "A Cancellation Mechanism for Cooperative Systems" filed herewith, U.S. patent application Ser. No. 11/130,293, entitled "Type Server Caching the Proxy/Stub Generation filed herewith, U.S. patent application Ser. No. 11/129,847, entitled "Structuring An Operating System Using A Service Architecture" filed herewith and U.S. patent application Ser. No. 11/130,300, entitled "Coordination of Set Enumeration Information Between Independent Agents" filed herewith.

FIELD OF THE INVENTION

The invention relates to communications between processes in computers and in particular to a mechanism for coordinating reference counting.

BACKGROUND OF THE INVENTION

A standard way to communicate between two processes A and B (running on the same machine or running on different machines) is to send a message. Often, for example, it is desirable to enable process A to send a message to process B asking process B to execute code on behalf of process A. Typically, process A must have knowledge of a port or contact point for process B in order to do this.

One way to enable process A to call process B is via a remote procedure call (RPC). A remote procedure call enables a process on one computer to cause code to be executed in another process on the same or on a different computer, without requiring explicit code to be written by a developer or programmer to perform that particular call. An RPC is initiated by the caller process (client) sending a request message to a remote system or second process (server) to execute a certain procedure using supplied arguments. A result message is returned to the caller. For example, in a remote procedure call, a function call may be made by process A, in which the name of the procedure that process B is to execute on behalf of process A and a set of parameters for the procedure, are specified. Process B executes the code and returns a message to process A. When the code in question is written using principles of object-oriented programming, RPC is sometimes referred to as remote invocation or remote method invocation.

A remote procedure call typically follows a particular protocol (another way of saying this is "it uses a particular interface") so that potentially unrelated processes can communicate. The protocol or interface defines the methods and the values which the processes agree upon in order to cooperate.

The procedure of transforming the function call into a message is called marshalling. Marshalling may include gathering data from one or more applications or non-contiguous sources in computer storage, putting the data pieces into a message buffer, and organizing or converting the data into a format that is prescribed for a particular receiver or programming interface. Marshalling typically converts what the code in process A sees as a function call into a message to be sent to process B. The message typically includes the name of the function and a set of parameters, coded in a way that process B understands. Process B receives the message and has to transform the message into a call to process B's internal function. The process of converting a message into a function call is called unmarshalling. The piece of code that performs marshalling in process A is called a proxy and typically resides in the client process. The corresponding piece of code on the server side that performs unmarshalling is called a stub.

Within the context of object oriented programming, process A and process B can be viewed as objects encapsulating data and functions. Some well-known technologies that take this approach are Sun Microsystem's JAVA and Microsoft's COM and DCOM. That is, process B may be viewed as a container for one or multiple objects, whose methods are the functions invoked by process A. In object oriented systems, therefore, process A invokes a method of a particular object of process B instead of invoking a function in process B. To do this, process A must have some way of identifying the object in process B that process A wishes to invoke.

The data stored in process A which enables process A to identify the object of process B is known as a reference to the object. The reference stores information concerning how to locate the object: that is, the reference must be sufficient to identify the process and within the process to identify the object whose method is to be invoked.

It is often helpful for a process to know when no more references to a resource exist. This may be necessary to comply with protocols, for garbage collection (e.g., so that memory resources used to store information associated with the shared resource can be reclaimed, etc.), or for signaling purposes (e.g., so that the execution status of the second process can be determined), or for various other reasons. Reference counting is a technique of storing the number of references, pointers or handles to a resource such as an object or a block of memory. With simple reference counting, whenever a reference is destroyed or overwritten, the reference count of the resource it references is decremented, and whenever a reference is created or copied, the reference count of the resource it references is incremented. When the number of references to a resource reaches zero, the resource is considered to be inaccessible, and is often destroyed. Some methods of reference counting require the process that shares the reference and the process that receives the reference to be actively involved in reference counting and to cooperate with each other. One problem associated with this approach is that it only works when both processes run perfectly: if a process fails or does not complete successfully, the reference count may not be correct. It would be helpful if there were an efficient way to overcome these and other reference counting problems.

SUMMARY OF THE INVENTION

To facilitate management of objects implemented by a service, the implementer of a service is notified when no other services hold a reference to the object. After revoking an object, all references previously exported for the object cannot be used to invoke the object. Thus, if no further exports occur after the revoke, no further invokes on the object should be made. The above is accomplished by reference counting. Reference counting is shared between an in-process service runtime and a machine-wide service. The machine-wide service intercepts all messages between processes and maintains a table for each process in the system. A mechanism for synchronization such as a shared monitor or a locking mechanism is not required. The machine-wide service maintains a count for the total number of references to an object or resource (the total reference count or global reference count), a count for the number of exports of a object (the global export count) and a count of the number of exports that must be received by the machine-wide service before a revoke can occur (the exports before revoke count). When a process exports an object or resource, the process keeps a local export count. The machine-wide service increments the global export count for the object or resource and increments the global reference count for the object or resource. When a process exports a reference to an object or resource to a second process, the second process can pass that reference on to a third process. The machine-wide service increments the global reference count for a passed reference but does not increment the global export count. When a process releases a reference to an object or resource, the process sends an unreferenced message. The machine-wide service decrements the global reference count in response to receiving the unreferenced message. When the global reference count for a resource or object drops to zero, the machine-wide service deletes the table entry for the object or resource and sends the unref message to the sharing process. The unref message includes the value of the global export count at the time of the unref notification. The sharing process compares the global and local export counts. If the local export count is greater than the global export count of the unref, there are committed exports which have not yet been unreferenced. If both counts are the same, the committed exports have been accounted for. The sharing entity subtracts the global count received from the local export count. Thus the local export count has the meaning of the total number of exported references still in use.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
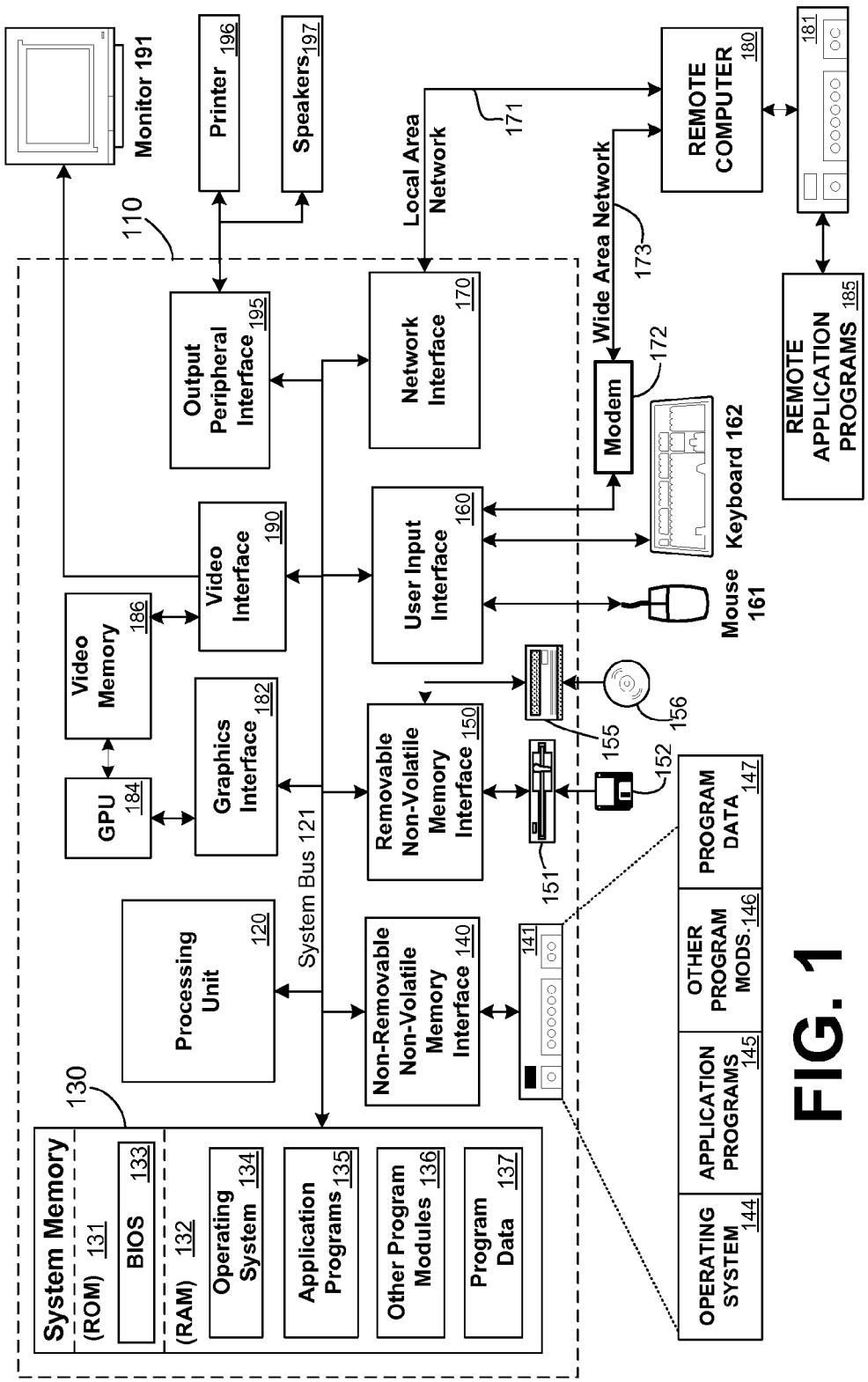
FIG. 1 is a block diagram showing an exemplary computing environment in which aspects of the invention may be implemented.

When a process in a distributed system wants to share one of its resources with another process, typically, the sharing process (e.g., process B) exports a reference to the resource to the second process, the using process (e.g., process A). This reference is used by process A to access and use the shared resource. Process B often needs to know when process A no longer needs the resource or when process A no longer holds the reference. This may be necessary to comply with protocols, for garbage collection (e.g., so that memory resources used to store information associated with the shared resource can be reclaimed), or for signaling purposes (e.g., so that the execution status of the second process can be determined), or for various other reasons.

One way to keep track of references is by reference counting, a technique of storing the number of references, pointers or handles to a resource such as an object or block of memory. One method of reference counting requires the sharing process and the receiving process to be actively involved in reference counting and to cooperate with each other. One problem associated with this approach is that it only works when both processes run perfectly: if a process fails or does not complete successfully, the reference count may not be correct. (For example, a receiving process that fails will no longer require a shared resource but will not be able to inform the sharing process that it has failed/no longer needs the shared resource.)

Another way to implement reference counting is to have an independent process (that is, a process that is independent from the sharing and the using process) perform the reference counting. One possible approach is for an independent process to perform the reference counting is as follows. The independent process may maintain a registry of objects for the processes it monitors. When process B exports a reference for an object (e.g., object 1) to process A, the independent process may increment a counter for object 1 (e.g., it may set object_1_counter equal to 1). Suppose now that process A sends a reference to object 1 to process C. If the independent process monitors communications between processes, the independent process may detect this new reference to object 1 and may increment object_1_counter to 2. Now suppose that process A is finished with object 1. Process A may inform the independent process thereof and in response, the independent process may decrement object_1_counter to 1. If process C does the same thing, object_1_counter may be decremented to 0. When object_1_counter equals zero, the independent process may signal process B that no more references to object 1 exist by sending an "unref" (a unreferenced notification) to process B.

One problem that exists with this scheme arises because the actions of the processes may not be completely synchronized. That is, the decision to export a reference (made by process B, the sharing process) may not be fully synchronized with the action of incrementing the reference count (performed by the independent reference counting mechanism, which has been called the "independent process" above). Between the time that the independent reference counting process determines that an unref is to be sent and the time that the unref is received by process B, process B may have exported the resource again. For example, suppose process B has previously exported object 1 to process A. Suppose now process B commits to export object 1 to process C, but before the call to the independent process is made (and thus before the independent process updates object_1_counter to 2), process B is suspended (e.g., the cpu time allocated to process B expires) and the cpu starts to run process A. Suppose process A closes its reference to the object. The independent process detects the close, and decrements the object_1_counter (with a current value of 1) to 0, and sends process B an unref. When process B again receives processing time, process B may receive the unref, and therefore may execute with a set of incorrect assumptions. (Process B erroneously believes that no references to object 1 exist.)

Now consider the following scenario. Suppose that process B implements an object for which process A holds a reference (object_1_counter equals 1 for that object). Suppose process B has committed to export a reference to its object to process C. The independent process receives the export of process B and does what is required to provide process C with the reference, incrementing object_1_counter to 2. Process A closes its reference to the object. The independent process detects the close, decrements object_1_counter (now equal to 1). Process C closes its reference to the object. The independent process detects the close, decrements object_1_counter which becomes 0 and sends the unreferenced notification to process B. It will be apparent that process B will be unable to distinguish between the first scenario, in which an error is likely to result and the second.

In accordance with some embodiments of the invention, to avoid the above described confusion, another counter (per object) is added, the global export count. Whenever a reference is exported, both the global reference count and the global export count for the object are incremented. When an unreferenced message is delivered, the value of the global export count is included in the message, reset to zero, so that any further exports will commence with a global export count of 0. Process B is then able to distinguish between the above two scenarios because in the first scenario, process B will receive a global export count of one while in the second scenario, process B will receive a global export count of 2. In accordance with some embodiments process B keeps its own local export count. When process B received the unreferenced notification process B updates its local export count by decrementing from the local export count the value of the global export it receives. If the result is zero, process B is ensured that no more references exist. If the result is not zero, the value of the updated local export count reflects the number of exports not yet released. In the above two scenarios, the first updated local export count will be 1 while in the second scenario, the updated local export count will be 0.

Furthermore, a sharing process may need to be able to invalidate previously exported references to a resource. When a process revokes a reference to a particular resource, all the previously exported references may need to be invalidated. To be able to properly revoke references, it must be possible to determined when an operation is complete because an object may be being invoked at the same time the revoke is executed. One approach to solve the revoke problem is to synchronize the operation with the last exit of the current invocations, while not allowing any further invocations to the object to proceed. When the last ongoing invocation exist, the revoke operation returns, marking its completion. The independent process must also be kept abreast of which references being revoked. A simplistic approach would have the exporting process call the independent process with the order to revoke a particular object. The independent process may then mark the object as revoked, and wait until every other process either died or closed its reference to the object. The independent process could then ensure that current references in other processes could not be used to invoke the object and could ensure references could not be passed. Difficulties with this simplistic approach are demonstrated with the scenarios that follow. determine when an operation has completed, However, in the absence of a more sophisticated mechanism, the revocation notification may arrive at the independent reference counting process before some of the export notifications to be revoked arrive. The late-arriving exports therefore will not be revoked.

Scenario 1: suppose process B implements an object for which process A holds a reference. The global export count and global reference count equals 1. Process B commits to export a reference to process C but the export has not yet reached the kernel. Process B commits to revoke the object. The independent process gets the "revoke" operation.

Scenario 2: suppose process B implements an object for which process A holds a reference. The global export count and global reference count equals 1. Process B commits to revoke the object. The independent process gets the "revoke" operation.

Scenario 3: suppose process B implements an object for which process A holds a reference. The global export count and global reference count equals 1. Process B commits to export a reference to process C but the export has not yet reached the kernel. Process B commits to revoke the object. Process A closes its reference. The independent process handles the revoke, global reference count drops to zero and an unreferenced notification is sent to process B. The independent process needs to eliminate its data structures. The independent process receives the "revoke" operation.

Scenario 4: suppose process B implements an object for which process A holds a reference. The global export count and global reference count equals 1. Process B commits to revoke the object. Process B commits to export a reference to process C but the export has not yet reached the independent process. The independent process gets the "revoke" operation.

Scenario 5: suppose process B implements an object for which process A holds a reference. The global export count and global reference count equals 1. Process B commits to revoke the object. Process B commits to export a reference to process C. The independent process handles the export, therefore process A and process C hold references to the object. The independent process gets the "revoke" operation.

Scenario 6: suppose process B implements an object for which process A holds a reference. The global export count and global reference count equals 1. Process B commits to revoke the object. Process B commits to export a reference to process C but the export has not yet reached the independent process. Process B commits to revoke the object. The independent process gets the "revoke" operation. The independent process processes the export. In this case, the reference is not passed to the to process C because it has been revoked.

Scenario 7: suppose process B implements an object for which process A holds a reference. The global export count and global reference count equals 1. Process B commits to export a reference to process C but the export has not yet reached the independent process. Process B commits to revoke the object. The independent process gets the "revoke" operation. Process A closes its reference. The independent process releases its resources for the object. The independent process sees the export, creates its structures for the object. Process C gets the reference.

In Scenarios 1 to 3, process B wants to revoke all existing references. In Scenarios 4 and 5, only process A's reference should be revoked. However, with the simplistic approach, Scenarios 4 and 5 cannot be distinguished by the independent process. The same is true for Scenarios 1 and 2, where the independent process has no way of knowing that another reference is coming along, which should also be revoked. Scenario 3 exemplifies the problem that occurs when a revoke arrives at the independent process for an object the independent process has no knowledge of but for which there are references which need to be revoked.

To address some of the problems encountered above, in accordance with some embodiments, an object name is never repeated. That is, when a process revokes an object, it "deletes" the current name for the object. If the object is re-exported after a revoke, a new name is assigned. Without a "name" an object cannot be invoked from a different process.

Thus, after revocation, it is not possible to make further invocations on the object using previously exported references. This approach addresses Scenarios 4 and 5 as the independent process sees a different name. In Scenario 2, the independent process would mark the object as revoked, and would block out any invocation attempt, and any attempt to pass the reference. Scenario 1 would be handled by the independent process like Scenario 2, marking the object as "revoked". If the new export arrived before process A closed the reference, it would be blocked (Scenario 6). Scenario 7, however, shows what would happen if process A closed its reference before the kernel got process B's export.

If the independent process ignores revokes for unknown objects, Scenario 3 essentially becomes Scenario 7. The two issues with this approach are:

Generation of local names has to be robust, so that the same name does not appear twice during the lifetime of a process (a running service).

Letting the service detect calls through revoked references is inefficient, as the independent process has already allocated resources to perform the call, and performed work to that end. So, it must be possible to let the independent process eventually know about the revocation of objects in Scenario 7.

The first issue can be avoided by assuming a large enough even number space (i.e., a 64-bit number), which would make it extremely unlikely to repeat usage of the same name during the life of the service. The second issue can be solved by letting the process return an exception indicating the fact that an invoked object has been revoked. The independent process, upon seeing this, could mark the object as revoked, blocking further invocations and reference passing.

Thus in some embodiments of the invention, the first time a process or service exports a reference to one of its objects, the object has no reference name. The service assigns a new name to the object, assured to not have been used before in the life of the service, and uses that name as the reference being exported. The name assigned by the service is an even number. The service keeps a Local Export Count (LEC) to keep track of the number of times the name has been exported. The initial value of the LEC is 1. The first time the kernel sees a reference being exported from a service, it builds a data structure with two counters, a Global Reference Count (GRC), and a Global Export Count (GEC). The initial value both GRC and GEC receive is 1. The independent process keeps a table of references for each service. The table entries are created by the kernel, and are indexed by the reference name. The table keeps track of the references that a service holds. When a reference is passed to a service not implementing the object behind it, the independent process creates a new entry in the table, indexing it with an odd number which is not being used by the service. This is the name the service will need to use to invoke or pass the reference. Additionally, the independent process increments the GRC of the object. When a reference is passed to a service which happens to be the one implementing the object behind it, the independent process passes the service the name the service gave the object when it was exported. The service can therefore recognize immediately that it is one of its objects, and which object it is. When a service exports a reference, it increases its LEC. If the independent process knows about the reference, the independent process increments the GEC of the object. The independent process always creates a new entry in the table and the GRC, as the reference is being passed to another service. When a service revokes one of its references, the independent process marks the object as revoked (if it knows about it), blocking any further invocation attempts on the reference, as well as any reference passing. If the independent process does not know about the reference, it ignores the operation. When a service closes a reference, the independent process takes the corresponding entry out of the table it maintains. Additionally, it decreases the GRC by 1. When the GRC of an object drops to 0, the independent process invokes an unreferenced operation for the object (if the object has not been revoked), passing the known GEC to the service. In any case, the independent process cleans up its data structures for the object. When the service receives an unreferenced call, it decreases its LEC by the amount of the GEC the independent process passed. The service detects that no more references exist when the resulting LEC is 0. When a service receives an invocation for a non-existing object name, it returns an exception indicating so. The independent process, upon seeing the exception, marks the object as revoked, or ignores the operation, if the object is unknown.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Coordination of Reference Counting

Figure 2:
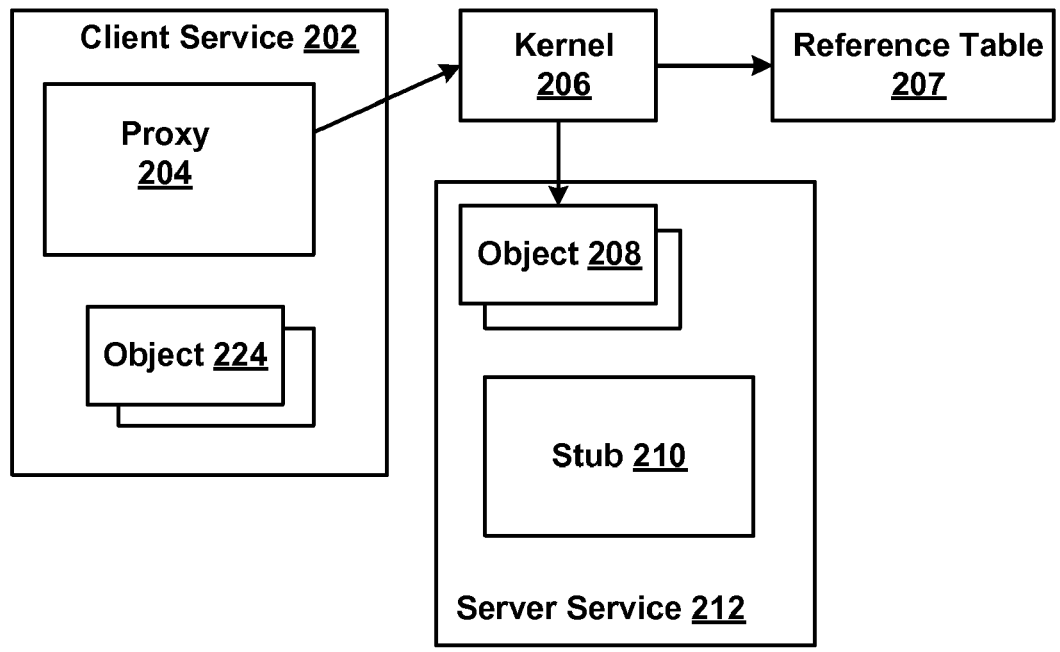
FIG. 2 is a block diagram illustrating relationships between services in an exemplary service-based operating system in accordance with one embodiment of the invention.

FIG. 2 is a block diagram of an operating system whose architecture is based on a service model, in accordance with some embodiments of the invention. The operating system or portions thereof may reside on or may access one or more computers such as computer 110 described with respect to FIG. 1.

In some embodiments of the invention, the operating system includes entities that are processes, agents, services, components or modules comprising containers for objects or resources that are described through interfaces. FIG. 2 illustrate an exemplary "client" service 202 and an exemplary "server" service 212, although it will be appreciated that any number of client services and server services may exist in the operating system. Moreover, a "client" service in one interaction may act as a "server" service in another: that is, "client" and "server" terminology refers to roles within a particular interaction rather than to intrinsic differences in hardware, software, and so on. Each service may be implemented through the use of one or more objects. For example, in FIG. 2, the client service 202 includes a proxy object 204. The client service 202 may also include one or more other objects or resources, as represented by object 224. Similarly, the server service 212 may include a stub 210 and one or more objects, as represented by object 208. A service may require support from one or more other services and the code specifying the service may require the loading of specific run-time support to run correctly. Services may reside in the same address space in the local machine or in a computer of a computer network. Services alternatively may reside in different address spaces in the local machine or on different computers of a computer network.

A trusted entity may be viewed as a unique distinctive process, module, component, agent or service that mediates communications between processes in the system. In some embodiments the trusted entity is able to distinguish between data parameters and reference parameters in messages passed between processes. In some embodiments the trusted entity has a trusted channel to every agent, service, module, component or process for mediating resource access and reference. Communications with the trusted entity therefore are secure, meaning that processes other than the trusted entity are unable to access or modify transmissions or messages sent between processes. Moreover, the trusted entity may be capable of identifying the originator of a message.

In some embodiments of the invention, the trusted entity is the kernel 206. The kernel 206 can implement and expose its objects (not shown) to other services, such as to services 202 and 212 in FIG. 2. In some embodiments of the invention, the kernel 206 is trusted code. In some embodiments of the invention, the only trusted code is the kernel 206. In some embodiments, to avoid forgery of object references, only trusted code is able to manipulate an object reference. Hence in some embodiments of the invention, only the kernel 206 is able to manipulate an object reference. A service that holds a reference to an object refers to the reference by a representation referred to herein as a reference or as a local reference id. In some embodiments of the invention, the local reference id is understood only by the kernel 206. Hence, for example, a communication sent by client service 202 to a server service 212 invoking a method of object 208 would be mediated by kernel 206. Kernel 206 in some embodiments of the invention, creates and maintains one or more reference tables, as represented by reference table 207 in FIG. 2, to resolve the object reference received from client service 202 to the address of an object 208 to be invoked.

A service may communicate with another service by sending a method invocation to another object via an object reference (e.g., via a remote call). All communications among services are assumed to be and are treated as though they are remote. The client and server services may be in separate (remote) containers or may be co-located in the same container but in either case, the semantics of the call is remote.

A service interface may be specified in an interface definition language or via a contract. In some embodiments of the invention, a subset of an existing language, such as but not limited to C#, is used to define the contract. In some embodiments of the invention, a subset of the application implementation language, such as but not limited to C#, is used to define the interfaces. A service written in C# therefore will seamlessly integrate with the C# contract without requiring the mapping necessitated in traditional systems which use an IDL language for contracts. Services written in other languages such as for example, unmanaged C++ may have a translation table which maps constructs from the C# interface to constructs in C++. Resultant C++ services can interoperate with the C# service as long as the system service model and interface definitions are not violated.

Services may be mapped in a one to one relation to an address space. If such is the case, protection ensues as a consequence of the address space provided by the memory management unit. Alternatively, in some embodiments, multiple services can be located within the same address space. In this case, protection is obtained by a managed code run-time (such as, for example, Microsoft's CLR or Common Language Runtime). Services communicate with each other independent of their location.

Failure and security boundaries in the system may exist at the service level and may be reinforced by hardware protection at the address space and machine levels. Service recovery actions including the ability to restart, and dependency tracking are provided by the operating system. Optimizations may accrue for services that are located within the same address space.

A method invocation can only be interpreted by the receiving object. The receiving object decides what action or actions are to be taken, based on the information passed with the invocation. The information passed may include specific data structures and/or references the invoker passes to the object being invoked.

The set of invocations an object accepts through a particular reference and the way the object is supposed to react to such an invocation is referred to as the interface supported by the object through that reference. Hence, the kernel will not necessarily know what the particular interface implemented by a referenced object is and does not need access to that information. It will be appreciated that it is possible to have different references designating the same object implementation through different interfaces.

An object in some embodiments is an implementation of an interface within some service and is an independent unit of failure. An object may be expressed and coded in any programming language capable of passing parameters and control.

An object reference in some embodiments identifies the object to which the reference refers and is not able to be forged. A reference confers to the holder the authority to invoke any of the methods of the interface for which the reference to the object was created. An object reference may be revoked and may be passed (optionally with restrictions) to another service or to other services as an argument of an invocation or as return results.

Use of an interface so defined enables the definition of a class implementing the interface and whose method implementations are stubs which perform the task of parameter marshalling. Instances of such a class are herein referred to as proxies, the proxies sitting in for the actual objects to which they refer and having the same interface.

In accordance with some embodiments of the invention, when a service, agent or process (e.g., a first process) wants to make an object available to another process (e.g., a second service, agent or process), instead of invoking a trusted entity to register the object reference for export from the first process, the trusted entity recognizes that a new object reference is being exported by the first process by monitoring communications between processes and inspecting the reference name. The trusted entity automatically creates an entry for the object reference in a table maintained for the first process when a reference to the object is exported. In some embodiments, the trusted entity recognizes that the object reference is a reference which has been exported by the first process because of the naming convention used to name the object reference. In some embodiments of the invention, object references owned by the passing process are identified by naming the reference an even number (e.g., giving the object reference a name which is an even number, such as naming the object reference "2").

A reference that is passed to a process (that is, is passed to the second process by the first process but is not owned by the first process) may also be referred to as "foreign" reference. An object reference being passed to the second process by the first process (foreign to both the first and the second process) is identified by naming the object reference an odd number. It will be appreciated that there are numerous other naming conventions that would enable the trusted entity to distinguish exported references from foreign or passed references. For example, foreign references may be named with a standard prefix which identifies the reference as a foreign reference. A name that contains or begins with or ends with a particular character or series of characters such as "0", "1", "FOR", etc. may identify the reference as foreign, while a name that contains or begins with or ends with a particular character or series of characters such as "1", "0", "EXP", etc. may identify the reference as exported (owned by the process sending the message).

Upon recognizing the reference to be a new exported reference, the trusted entity may create an entry in a table for the exporting process (the first process) for the reference. The trusted entity may also create an entry in a table for the process to which the reference is being exported, wherein the index to the table entry identifies the reference as one foreign to the second process and may pass this index to the table entry to the second process.

Thus, in an exemplary IPC system according to some embodiments of the invention, when a first process (process B), wants to export an object reference (i.e., make the referenced object owned by the first process available to a second process (process A)), the first process identifies the object reference as exported. In some embodiments of the invention, the reference is identified as exported by assigning the reference a name which is an unused even integer. A trusted entity that mediates or monitors communications between processes recognizes that the reference in the communication is exported, because the reference name is an even integer. If the reference is a new reference, the trusted entity creates an entry in a table maintained for process B. If a reference to the object is to be exported or passed to the second process (process A), the trusted entity generates a new name or index for the object reference in a second table maintained for process A. The name or index the trusted entity generates in some embodiments of the invention identifies the object reference as one which is passed to process A but is not owned by process A, by making the name or index into the table maintained for process A an odd integer. The trusted entity may then provide process A with an object reference which is the odd integer that is the index of the entry in process A's table corresponding to the reference.

In some embodiments of the invention, a machine-wide process (an independent process) and a process which shares a resource both participate in reference counting. Synchronization of the independent process and the sharing process by mediation by an external monitoring module and locking of shared data is not required. In some embodiments of the invention a global export count maintained by the trusted keeps track of how many processes hold a reference for the resource (i.e., how many references to the object are outstanding). A local reference count maintained by a sharing process keeps track of how many references have been exported by the sharing process. When the process receiving the reference is done with a particular resource, the process so informs the independent process, which decrements the global reference counter. Similarly, when the process passes the reference for the resource to another process, the independent process is informed thereof and increments the global reference counter. When there are no outstanding references to the resource (the global reference counter equals zero), the independent process deletes the information stored for the resource and notifies the sharing process that no outstanding references remain for the resource. In some embodiments of the invention, the sharing process is notified that there are no outstanding references for the resource by the sending of an "unreferenced notification".

In some embodiments of the invention, because the decision to export a reference may not be fully synchronized with the action of incrementing the reference count, even though the global reference counting mechanism detects an instant in which no other processes hold a reference to the shared resource, it may be that the sharing process has already committed to share the resource again, but has not yet notified the global reference counting mechanism of this intention. Under these circumstances, it would be incorrect for the sharing process to conclude that the last reference has already been used to completion and that the resource therefore can be eliminated.

Such a circumstance is often referred to as a "race" condition. To handle such a race condition, in some embodiments the global reference counting mechanism is able to distinguish in its reference counting between the sharing process passing the reference, and some other process passing the reference. Thus, in some embodiments of the invention, the global reference counting mechanism maintains two different counts, one count for the total number of live references that are known and another for the total number of references exported by the sharing process. The total number of references exported by the sharing process is referred to herein as the global export count. The sharing process also keeps track of how many times it has decided to export a reference to the resource. This count is identified herein as the local export count. (It will be apparent that the global export count therefore will never be greater than the local export count). Both counts do not have to be the same at all times. The sharing process may not know the value of the global export count at the time the global reference counting mechanism makes the decision to deliver an unreferenced notification. To make sure the sharing process reaches a correct conclusion, the global reference counting mechanism includes with its unreferenced notification the value of the global export count at the time of the unreferenced notification. The sharing process compares the local and global export counts. If the local export count is greater than the global export count in an unreferenced notification, the conclusion may be drawn that there are committed exports which have not yet been unreferenced. If however, the counts are the same it can be safely assumed that all previously committed exports have been properly accounted for.

In some embodiments of the invention, because the global reference counting mechanism has already eliminated the information stored for the resource (e.g., in a table maintained by a trusted entity), the sharing process must subtract the global export count received from its local count, hence the local export count refers to the total number of exported references which may still be in use.

Figure 3:
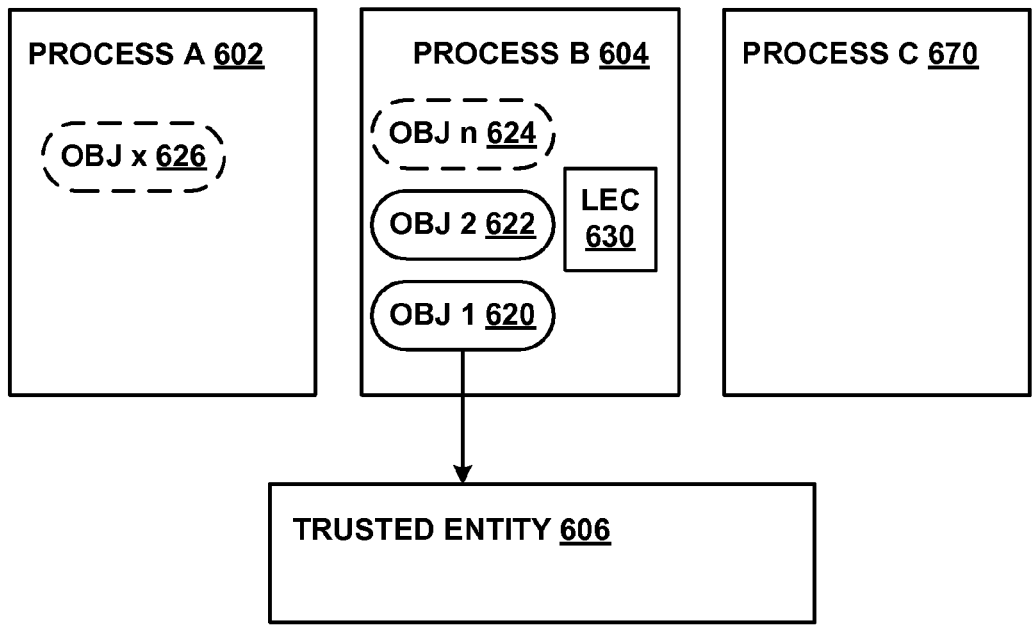
FIG. 3 is a block diagram of an exemplary system for coordinated reference counting in accordance with one embodiment of the invention.

FIG. 3 is a block diagram of a system for coordinating reference counting in accordance with one embodiment of the invention. A system for coordinating reference counting may include one or more processes, entities, agents or services including one or more objects or resources that may be shared with one or more other processes, agents or services. The system may also include one or more tables for storing information about shared objects or resources, and/or an independent entity, process, service or agent that mediates communications between processes, entities, agents or services.

In FIG. 3, exemplary processes such as process A 602, process B 604 and process C 670 may reside on the same computer or on different computers within a computer network. In some embodiments of the invention, process A 602, process B 604 and process C 670 reside in different address spaces. Alternatively, one or more of the processes may share an address space. It will be appreciated that although FIG. 3 illustrates only three processes in addition to the trusted entity 606, the invention as contemplated is not so limited. That is, a system for reference counting may include any number of processes. Trusted entity 606 in some embodiments of the invention mediates communications between processes such as those between process A 602 and process B 604 and process C 670. In some embodiments of the invention, trusted entity 606 is the kernel of an operating system. In some embodiments of the invention, the operating system is an operating system such as the one described above with respect to FIG. 2.

Process A 602, process B 604 and process C 670 may include one or more objects or resources representing resources that may be shared with other processes. In FIG. 3, process B 604 as illustrated includes object 1 620, object 2 622 . . . object n 624. Similarly, process A 602 as illustrated in FIG. 6 includes exemplary object x 626, although it will be appreciated that process A 602 and process B 604 may include any number of objects. Although process C 670, as illustrated includes no processes, it will be appreciated that process C 670, like process A 602 and process B 604 may include any number of objects. Process A 602 may export a reference to one or more of its objects (e.g., a reference to object x 626) to other processes (e.g. to process B 604 or to process C 670). Similarly, process B 604 may export a reference to one or more of its objects (e.g., a reference to one or more of objects: object 1 620, object 2, 622 . . . object n 624) to other processes (e.g., to process A 602 or to another process such as process C 670). In some embodiments of the invention, the first time a process or service (such as exemplary process B 604) exports a reference to one of its objects, the object has no reference name. The service may assign a new name to the object, assured to not have been used before in the life of the service, and may use that name as the reference being exported. In some embodiments of the invention, the name assigned by the service is an even number. The service may also keeps a Local Export Count (LEC) to keep track of the number of times the name has been exported. Process A 602 may pass a reference to an object that has been exported to it (such as, for example, a reference to one or more of objects: object 1 620, object2 622 . . . object n 624) exported to it by other processes (such as, for example, by process B 604). Similarly, process B may receive a reference to an object (such as, for example, a reference to object x 626) exported to it by other processes (such as, for example, by process A 602). A process may pass a reference to an object exported to it to another process. For example, process A may pass to process C 670 a reference to object 1 620, exported to process A 602 by process B 604.

The trusted entity 606 mediates communications between processes and may also generate and send communications to processes. The communications mediated or sent by the trusted entity 606 may include an object reference. The trusted entity 606 may maintain one or more tables for each process in the system. The trusted entity 606 in some embodiments of the invention, maintains a table for each process (e.g., for process A 602, process B 604 and process C 670). FIG. 3 illustrates exemplary tables for process A (table A 610), process B (table B 612) and process C (table C 614). The trusted entity 606 may maintain a global export count, a global reference count (also called a global reference count) and an exports before revoke counter for each object exported or passed by the process in the table the trusted entity 606 maintains for that process. For example, in table B 612, entry 1 612a may represent information stored for object 1, including a global export count 660, a global reference count 662 and an export before revoke counter 664. It will be appreciated that although not shown in FIG. 3, analogous counts may be maintained in table A 610 for objects process A 602 exports and in table C 614 for objects process C 670 exports and so on.

Thus, information maintained by the trusted entity 606 may include one or more of the following for each object in the table: a global export count (a count of the number of objects or resources that the trusted entity knows of that a process has exported), a global reference count (a total number of outstanding references to an object or resource) and a exports before revoke counter (a number of exports which must take place before a revoke can be completed). The table may also include other information including, for example, an index (which may be represented by the location of the object in the table), a location of the object in the sharing (originating) process and an identification of the process to which the object was exported or from which the object was imported. The trusted entity may also maintain other tables such as a table of passed and exported object references for each process.

Figure 4:
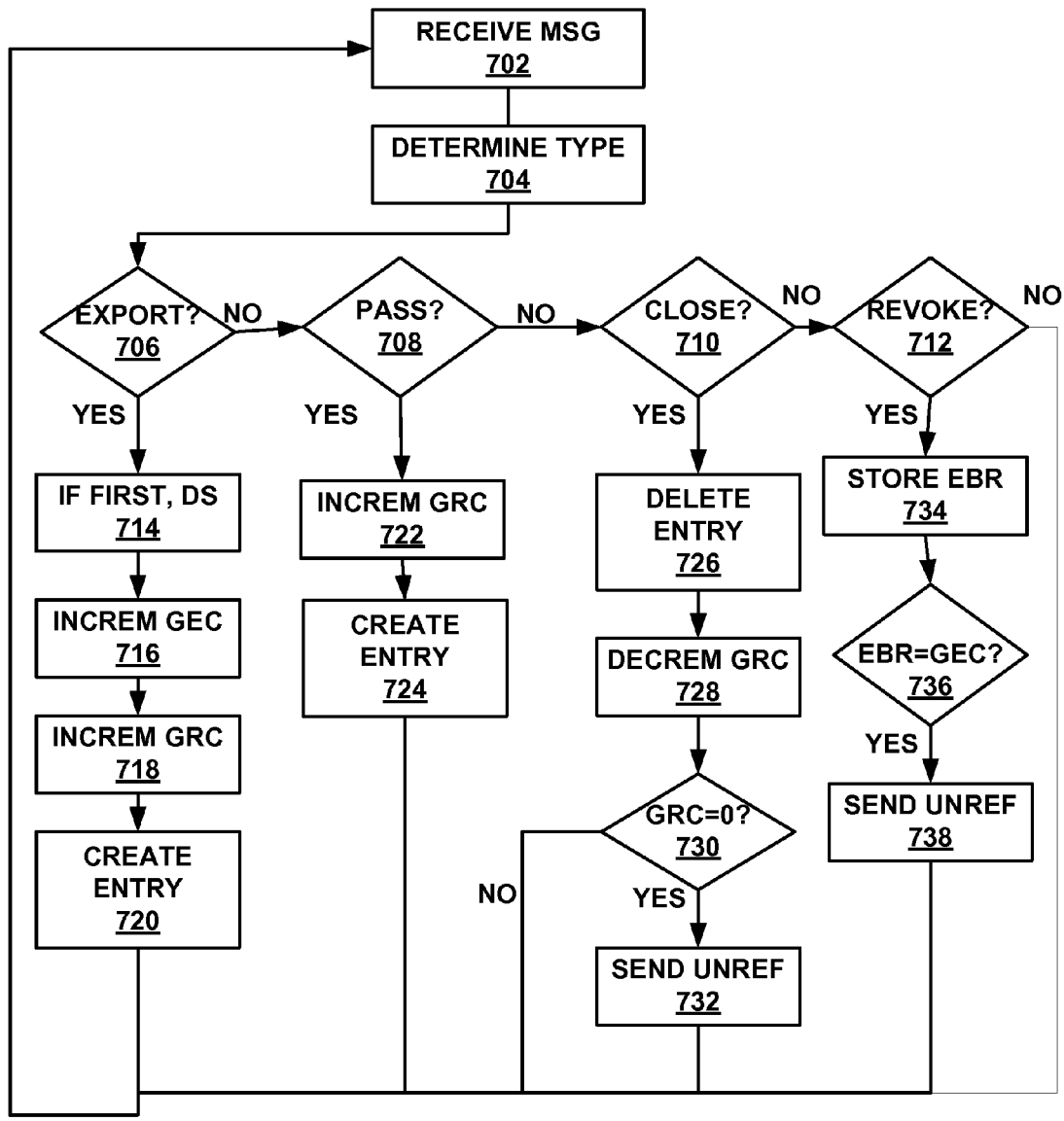
FIG. 4 is a flow diagram of an exemplary method for coordinating reference counting in accordance with one embodiment of the invention.

FIG. 4 illustrates an exemplary method for coordinated reference counting in accordance with some embodiments of the invention. As described above, in some embodiments of the invention, the first time a process or service (such as exemplary process B 604) exports a reference to one of its objects, the object has no reference name. The service may assign a new name to the object, assured to not have been used before in the life of the service, and may use that name as the reference being exported. In some embodiments of the invention, the name assigned by the service is an even number. The service may also keep a Local Export Count (LEC) to keep track of the number of times the name has been exported. At 702 a message is received by the trusted entity. At 704, the type of message received is determined. If the message is an export message (706), processing continues at 714. If the message is not an export message, processing continues at 708. If the message is a message passing a reference to an imported object to another process, processing continues at 722. If the message is not a message passing a reference to an imported object to another process, processing continues at 710. If the message is an unreferenced message, processing continues at 726. If the message is not an unreferenced message, processing continues at 712. If the message is a revoke message, processing continues at 734. If the message is not a revoke message, the message may be processed according to further processing rules or an error message may be generated.

If the message is an export message (706), processing may continue at 714. The first time the kernel sees a reference being exported from a service, it builds a data structure with two counters, a Global Reference Count (GRC), and a Global Export Count (GEC). The data structure is indexed by the reference name and is used to keep track of the references that a service holds. Hence, if this is the first time the reference is being exported, the trusted entity creates the data structure at 714. At 716 a global export counter may be incremented in a table maintained by the trusted entity. At 718 a global reference counter may be incremented in a table maintained by the trusted entity. At 720 an entry may be created in a table maintained by the trusted entity for the receiving process for the referenced object or resource.

For example, suppose that process B 604 decides to share object 1 620 with process A 602. Process B 604 may increment a local export counter 630 (e.g., from zero to one). Process B 604 may send a communication to process A 602, notifying process A 602 that object 1 620 is available for use by process A 602. This communication may be mediated by trusted entity 606. Alternatively, a communication may be sent to the trusted entity 606 from process B 604 informing the trusted entity 606 that process B 604 wants to export object 1 620 to process A 602. In response to the communication, in some embodiments of the invention, trusted entity 606 may create an entry for object 1 in table B 612 for object 1 620, as described above. In addition or alternatively, trusted entity 606 may generate three counters for object 1 620 in entry 1 612a in table B 612. The counters may be incremented as follows: the trusted entity 606 may increment a global export counter, 662 (e.g., from zero to one) because process B 604 has indicated that object 1 620 is to be exported to process A 602. The trusted entity may increment a global reference counter 660 (e.g., from zero to one) because a new reference to object 1 620 is being created. The trusted entity 606 may also generate a export before revoke counter (e.g., set to zero because there are no exports that must be completed before a revoke command can be processed.) In some embodiments of the invention, if this is the first export for this object, an export before revoke counter may be initialized to zero. Trusted entity 606 may also create an entry for object 1 620 in table A 610 as described above. Process A 602 may receive the reference to object 1 620.

If the message is not an export message, processing may continue at 708. If the message is a message passing an imported reference to an object to another process (a receiving process), processing may continue at 722. When a reference is passed to a service not implementing the object behind it, the independent process creates a new entry in the table, indexing it with an odd number which is not being used by the service. This is the name the service will need to use to invoke or pass the reference. Additionally, the independent process increments the GRC of the object. When a reference is passed to a service which happens to be the one implementing the object behind it, the independent process passes the service the name the service gave the object when it was exported. The service can therefore recognize immediately that it is one of its objects, and which object it is. At 722 a global reference counter may be incremented and at 724, an entry may be created in the table the trusted entity maintains for the receiving process at 724. It will be noted that the global export counter will not be incremented because the exporting process has not exported a reference to the object, in contrast, the using process has passed a reference to the object to a third process.

For example, suppose now that process A 602 decides to pass a reference to object 1 620 to process C. A communication conveying such may be mediated by the trusted entity 606 and in response thereto, trusted entity 606 may increment the global reference counter 660 (e.g., from one to two). It will be appreciated that the global export counter will not be incremented because process B 604 has not exported object 1 620 to process C 670, rather process A 602 has passed a reference to object 1 620 to process C 670. At this point, any of the processes holding a reference to object 1 620 may decide that the process no longer needs object 1 620 and may inform the trusted entity 606 thereof.

If the message is not a message passing a reference to an imported object to another process, processing may continue at 710. When a service closes a reference, the trusted entity takes the corresponding entry out of the table it maintains. Additionally, it decreases the GRC by 1. When the GRC of an object drops to 0, the trusted entity invokes an unreferenced operation for the object (if the object has not been revoked), passing the known GEC to the service. In either case, the trusted entity cleans up its data structures for the object. When the service receives an unreferenced call, it decreases its LEC by the amount of the GEC the trusted entity passed. The service detects that no more references exist when the resulting LEC is 0. When a service receives an invocation for a non-existing object name, it returns an exception indicating so. The trusted entity, upon seeing the exception, marks the object as revoked, blocking any further invocation attempts on the reference, as well as any reference passing. If the trusted entity does not know about the reference, it ignores the operation. For example, suppose the message indicates that a service has closed a reference (710). Processing may continue at 726. At 726, the trusted entity may delete the entry in the table for the process sending the message for the object being unreferenced. At 728 the global reference count for the object in the table for the exporting object may be decremented. If the global reference count equals zero (730), an unref message may be send at 732 to the sharing process. If the global reference count does not equal zero, processing may continue at step 702.

For example, suppose now that process C 670 is finished with object 1 620. Process C 670 may send a notification thereof to the trusted entity 606. In response to the notification, the trusted entity 606 may decrement the global reference count 660 (e.g., from two to one) in table B 612 and may delete the entry in table C 614 that process C 670 has for that object. At 730, the global reference count does not equal zero so an unref message is not sent to process B 604. Suppose now that process A 602 no longer needs the reference to object 1 620 and so informs the trusted entity 606 by sending an unref message. The trusted entity 606 may receive the message, determine that the message is an unref message (710) may remove the entry for (i.e., entry 1 612a) for object 1 620 in table A 610 (726), and may decrement (728) the global reference count 660 (e.g., from one to zero). When the global reference count 660 for object 1 620 in table B 612 reaches zero (determined at 730), the trusted entity 606 sends an unref (732) to process B 604. In some embodiments of the invention, the unref includes the identity of the object that has been unreferenced and the global export count 662 (in this case the global export count 662 is one).

When process B 604 receives the unref message, process B may subtract the global export count (1) from the local reference count 630. If the result of this subtraction is zero, process B has exported that reference and there are no more references to object 1 620 in the system. If, however, the result of the subtraction is not zero (i.e., is greater than zero) then process B ignores the unref message because other references to object 1 620 may exist in the system.

If the message is not an unreferenced message, processing may continue at 712. If the message is a revoke message, processing may continue at 734. When a service revokes one of its references, the trusted entity marks the object as revoked (if it knows about it), blocking any further invocation attempts on the reference, as well as any reference passing. If the independent process does not know about the reference, it ignores the operation. At 734 the value for export before revoke counter may be received by the trusted entity from an argument of a revoke message (the local export count of the exporting process) from the exporting process/service. At 736 the value of the export before revoke counter is compared to the value of the global export counter, when the values of the counters are equal, an unref message may be sent to the using/receiving process at 738.

When a process wants to revoke all references to an object, the process issues a revoke operation for that object. The revoke operation in some embodiments carries the local export count as its argument. The revoke message may be received by the trusted entity 606. Process B will not use the same object name to export the object again. When the trusted entity receives the revoke message, it stores the argument of the revoke (the local export count of the exporting process) in the export before revoke counter in the table the trusted entity maintains for the exporting process. Hence the value of the export before revoke counter represents the number of exports process the exporting process has made for the object. When this number equals the global export count, then the trusted entity may issue an unref (with the argument of the unref equal to the global export count.

For example, suppose that process B 604 decides to revoke all its references to object 1 620. Suppose process B has exported object 1 to process A 602 and process C 670 and neither process A 602 nor process C 670 has sent an unref message for object 1 620. Process B's local export counter 630 in this case will be two. The values in table B 612 for the global export reference will be two. The trusted entity 606 will store two in the export before revoke counter 664. Because the export before revoke counter 664 (value equals two) equals the global export counter (value equals two), the trusted entity will send an unref to process A and to process C.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. An inter-process communication system comprising:
   a processor;
   a trusted entity configured to intercept a message from a first process that has received a reference to an object, wherein the message is destined for a second process;
   the trusted entity, in response to determining that the message is a message indicating that the first process is finished with the object reference, deleting an entry for the object in a table for the first process, decrementing a global reference count, the global reference count comprising a total of references to the object, and when the global reference count equals to zero, sending the message to the second process; and the trusted entity, in response to receiving a revoke message from the second process, the second process comprising an exporting process that exported a reference to an object owned by the exporting process, the revoke message including a count of a number of times the object was exported, comparing the count included with the revoke message and a global export count of the object stored in a table for the second process, and sending the message to the second process.

2. The system of claim 1, wherein the table for the second process comprises the global export count, the global reference count and a count representing the quantity of exports of the object that must be received before a revoke operation can be initiated.

3. The system of claim 1, wherein the global reference count is incremented when the second process exports the reference to the object.

4. The system of claim 1, wherein the global reference count is incremented when the first process passes the reference to the object to another process.

5. The system of claim 1, wherein the message is sent when the count of the number of times the object was exported is equal to the global export count.

6. A method for coordinating reference counting comprising:

intercepting, by a trusted entity, a message from a first process that has received a reference to an object, wherein the message is destined for a second process;

in response to determining, by the trusted entity, that the message is a message indicating that the first process is finished with the object reference, deleting, by the trusted entity, an entry for the object in a table for the first process, decrementing a global reference count, the global reference count comprising a total of references to the object, and when the global reference count equals to zero, sending, by the trusted entity, the message to the second process; and in response to receiving a revoke message from the second process, the second process comprising an exporting process that exported a reference to an object owned by the exporting process to the trusted entity, the revoke message including a count of a number of times the object was exported, comparing the count included with the revoke message and a global export count of the object stored in a table for the second process, and sending, by the trusted entity, the message to the second process.

7. The method of claim 6, further comprising, in response to determining that the global reference count is zero, sending the message indicating that there are no more object references to the object to the second process.

8. The method of claim 7, wherein the message sent to the second process includes the global export count comprising a count of a number of times the object was exported to at least one of a plurality of other processes.

9. A computer-readable storage medium storing thereon computer-executable instructions for coordinating reference counting between a machine-wide reference counting mechanism and a process within a inter-process communication system, the instructions when executed on a processor performing steps comprising:

intercepting a message from a first process that has received a reference to an object, wherein the message is destined for a second process;

in response to determining that the message is a message indicating that the first process is finished with the object reference, deleting an entry for the object in a table for the first process, decrementing a global reference count, the global reference count comprising a total of references to the object, and when the global reference count equals to zero, sending the message to the second process; and in response to receiving a revoke message from the second process, the second process comprising an exporting process that exported a reference to an object owned by the exporting process, the revoke message including a count of a number of times the object was exported, comparing the count included with the revoke message and a global export count of the object stored in a table for the second process, and sending the message to the second process.

10. The computer-readable medium of claim 9, comprising further instructions for:

generating the table entry for the global reference count in the table for the second process.

11. The computer-readable medium of claim 10, wherein in response to determining that the first process passed the object reference to a third process, incrementing the global reference count for the object reference and failing to increment the global export count.

12. The computer-readable medium of claim 9, wherein the table for the second process comprises the global export count, the global reference count and a count representing the quantity of exports of the object that must be received before a revoke operation can be initiated.

13. The computer-readable medium of claim 9, wherein the global reference count is incremented when the first process passes the reference to the object to another process.

14. The computer-readable medium of claim 9, wherein the message is sent when the count of the number of times the object was exported is equal to the global export count.

* * * * *